(12) United States Patent
Candelore et al.

(10) Patent No.: US 9,392,341 B2
(45) Date of Patent: *Jul. 12, 2016

(54) MULTI-CODED CONTENT SUBSTITUTION

(71) Applicants: SONY CORPORATION, Tokyo (JP); SONY ELECTRONICS INC., Park Ridge, NJ (US)

(72) Inventors: Brant L. Candelore, San Diego, CA (US); Leo M. Pedlow, Ramona, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 379 days.

This patent is subject to a terminal disclaimer.

(21) Appl. No.: 13/710,858

(22) Filed: Dec. 11, 2012

(65) Prior Publication Data

US 2013/0160054 A1   Jun. 20, 2013

Related U.S. Application Data

(63) Continuation of application No. 12/455,831, filed on Jun. 8, 2009, now Pat. No. 8,392,942.

(60) Provisional application No. 61/195,173, filed on Oct. 2, 2008.

(51) Int. Cl.
*H04N 7/10* (2006.01)
*H04N 7/025* (2006.01)
(Continued)

(52) U.S. Cl.
CPC ............ *H04N 21/81* (2013.01); *H04N 21/235* (2013.01); *H04N 21/2362* (2013.01); *H04N 21/2365* (2013.01); *H04N 21/23439* (2013.01); *H04N 21/234309* (2013.01); *H04N 21/435* (2013.01);
(Continued)

(58) Field of Classification Search
CPC .......... H04N 21/81; H04N 21/234309; H04N 21/23439; H04N 21/235; H04N 21/2362; H04N 21/2365; H04N 21/4345; H04N 21/4347; H04N 21/435; H04N 21/6336; H04N 21/64322; H04N 21/812; H04N 21/8456
See application file for complete search history.

(56) References Cited

U.S. PATENT DOCUMENTS 6,529,146 B1   3/2003   Kowalski et al.
7,720,432 B1   5/2010   Colby et al.
(Continued)

FOREIGN PATENT DOCUMENTS

CN   1327685 A   12/2001
CN   1578446 A   2/2005
(Continued)

OTHER PUBLICATIONS

International Search Report and Written Opinion, PCT/US2009/59037 (corresponding to U.S. Appl. No. 12/455,831), Dec. 18, 2009.
(Continued)

*Primary Examiner* — Oschta Montoya
(74) *Attorney, Agent, or Firm* — John L. Rogitz

(57) ABSTRACT

Multiple segment identifiers associated with a single item of content and substitute content associated therewith can be utilized as a mechanism to provide content substitution using multiple content formats by utilizing a segment routing state machine. This abstract is not to be considered limiting, since other embodiments may deviate from the features described in this abstract.

18 Claims, 4 Drawing Sheets

(51) Int. Cl.
*H04N 21/81* (2011.01)
*H04N 21/2343* (2011.01)
*H04N 21/235* (2011.01)
*H04N 21/2362* (2011.01)
*H04N 21/2365* (2011.01)
*H04N 21/434* (2011.01)
*H04N 21/435* (2011.01)
*H04N 21/6336* (2011.01)
*H04N 21/643* (2011.01)
*H04N 21/845* (2011.01)

(52) U.S. Cl.
CPC ....... *H04N 21/4345* (2013.01); *H04N 21/4347* (2013.01); *H04N 21/6336* (2013.01); *H04N 21/64322* (2013.01); *H04N 21/812* (2013.01); *H04N 21/8456* (2013.01)

(56) References Cited

U.S. PATENT DOCUMENTS

| | | | |
|---|---|---|---|
| 2002/0067907 A1* | 6/2002 | Ameres | H04N 21/23106 386/354 |
| 2003/0043924 A1 | 3/2003 | Haddad et al. | |
| 2003/0174837 A1 | 9/2003 | Candelore et al. | |
| 2003/0196211 A1* | 10/2003 | Chan | H04N 21/234363 725/131 |
| 2004/0017853 A1 | 1/2004 | Garrido et al. | |
| 2005/0028193 A1 | 2/2005 | Candelore et al. | |
| 2006/0130121 A1 | 6/2006 | Candelore et al. | |
| 2006/0174264 A1* | 8/2006 | Candelore | 725/34 |
| 2008/0059648 A1 | 3/2008 | Manges | |
| 2008/0127285 A1 | 5/2008 | Broberg | |
| 2008/0141303 A1 | 6/2008 | Walker et al. | |
| 2008/0155586 A1* | 6/2008 | Yang et al. | 725/32 |
| 2008/0281803 A1 | 11/2008 | Gentric | |
| 2009/0022165 A1 | 1/2009 | Candelore et al. | |

FOREIGN PATENT DOCUMENTS

| | | |
|---|---|---|
| CN | 101010952 A | 8/2007 |
| CN | 101202906 A | 6/2008 |

OTHER PUBLICATIONS

First Office Action, Chinese Application No. 200980139393.1 (related to U.S. Appl. No. 12/455,831), dated Dec. 5, 2012.

* cited by examiner

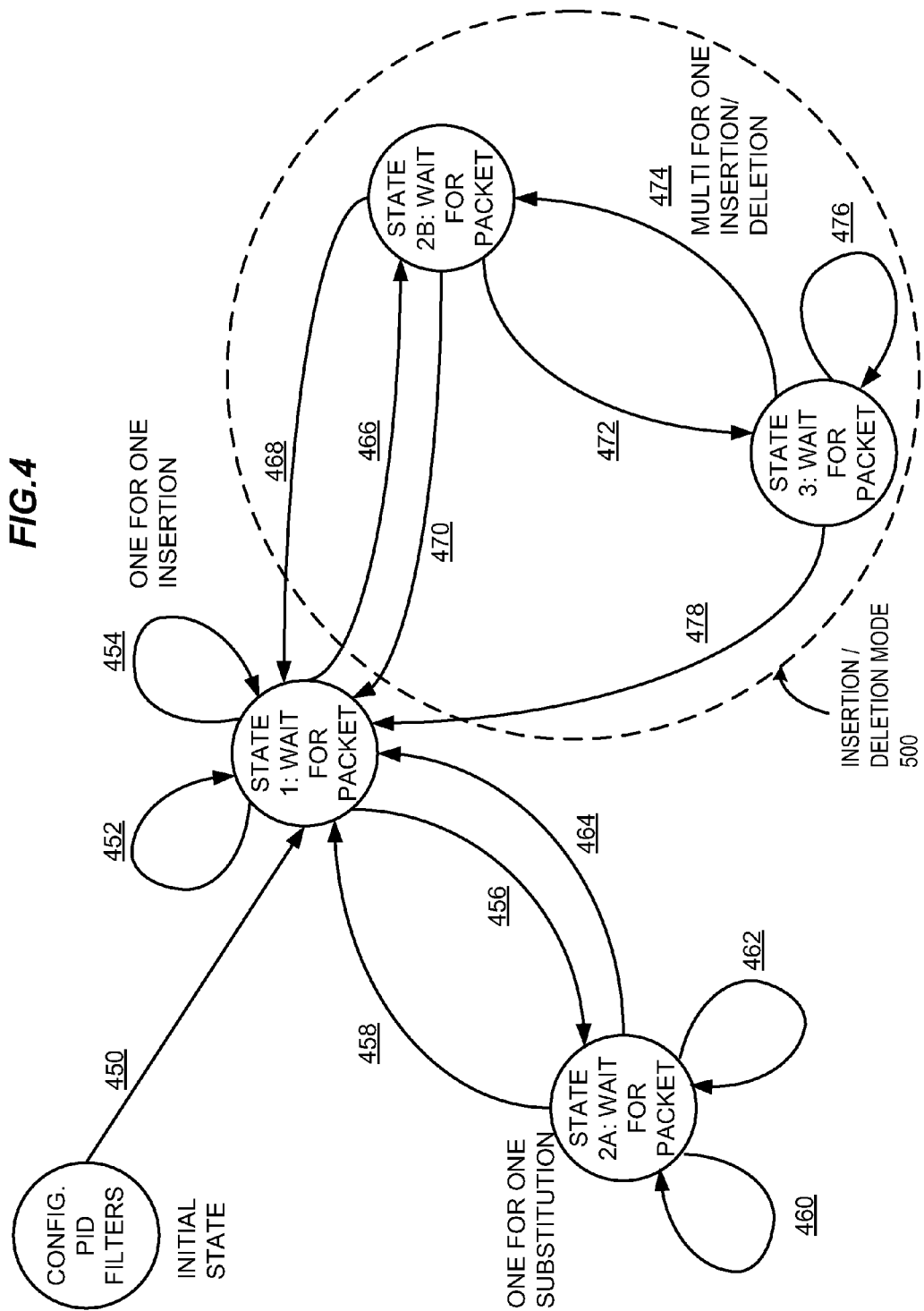

MULTI-CODED CONTENT SUBSTITUTION

CROSS REFERENCE TO RELATED DOCUMENTS

This application is a continuation of allowed U.S. patent application Ser. No. 12/455,831 filed Jun. 8, 2009, which claims priority benefit of U.S. Provisional Patent Application No. 61/195,173 filed Oct. 2, 2008 both of which is hereby incorporated by reference, and is also related to U.S. Patent Application Publication number US2009/0022165-A1 and its associated family which are hereby incorporated herein by reference.

COPYRIGHT AND TRADEMARK NOTICE

A portion of the disclosure of this patent document contains material which is subject to copyright protection. The copyright owner has no objection to the facsimile reproduction of the patent document or the patent disclosure, as it appears in the Patent and Trademark Office patent file or records, but otherwise reserves all copyright rights whatsoever. Trademarks are the property of their respective owners.

BACKGROUND

Conventional digital video content, such as MPEG video, can take the form of a single program, movie or other content with no opportunity for a service provider or a user to modify the viewing experience by selecting alternative content. Various mechanisms have been proposed for providing interactive content, but usually such proposals have been expensive to implement, can take up large amounts of bandwidth, and may require expensive specialized equipment including servers and/or other support equipment. Therefore, although there is a demand for "interactive" applications which allow an end viewer of video content to tailor what they watch and manipulate the content, no commercially viable system has yet appeared in the marketplace.

BRIEF DESCRIPTION OF THE DRAWINGS

Certain illustrative embodiments illustrating organization and method of operation, together with objects and advantages may be best understood by reference detailed description that follows taken in conjunction with the accompanying drawings in which:

FIG. 4 is an example state machine that can be used in certain implementations consistent with certain embodiments of the present invention.

DETAILED DESCRIPTION

Figure 1:
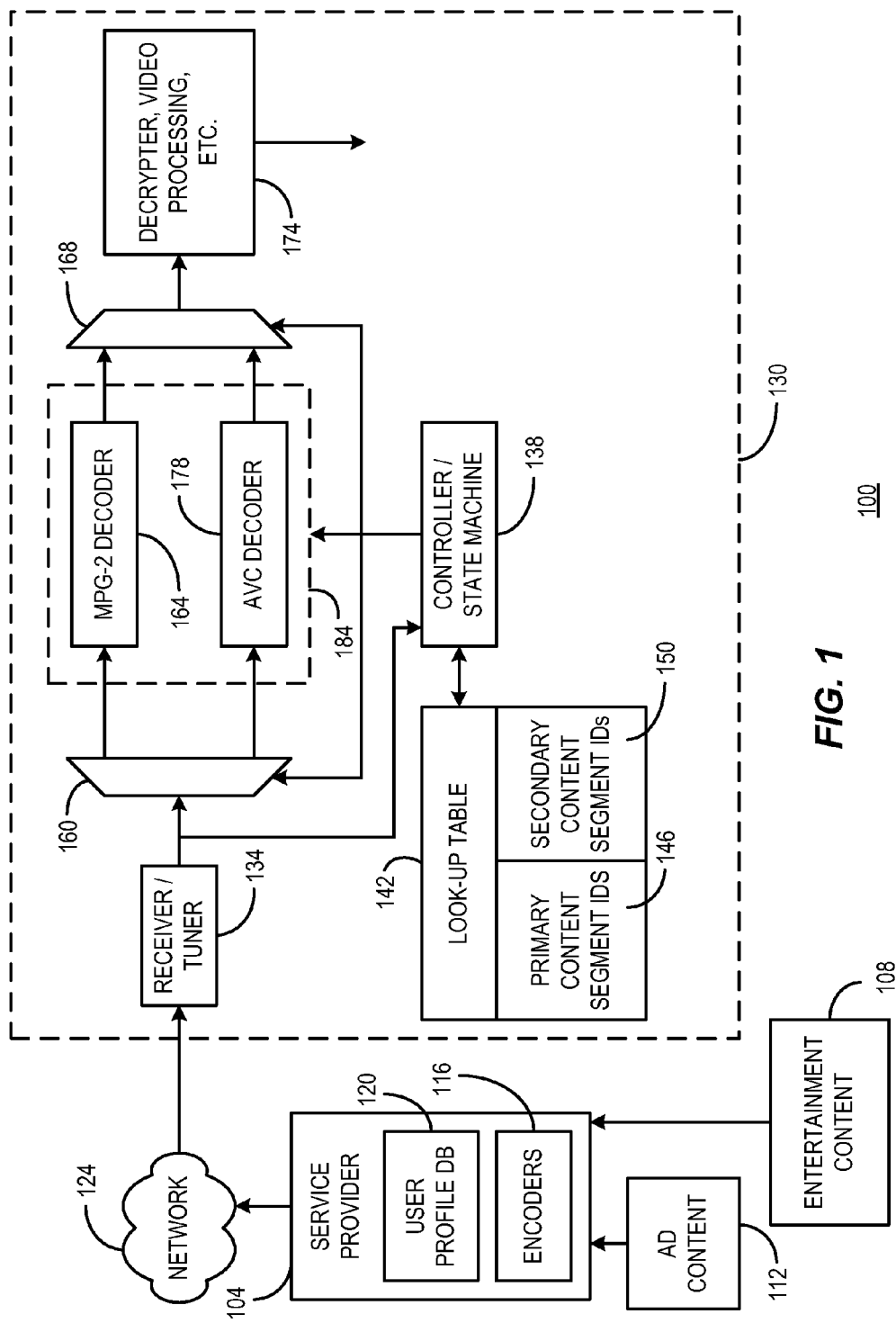
FIG. 1 is a block diagram of an example system consistent with certain embodiments of the present invention.

While this invention is susceptible of embodiment in many different forms, there is shown in the drawings and will herein be described in detail specific embodiments, with the understanding that the present disclosure of such embodiments is to be considered as an example of the principles and not intended to limit the invention to the specific embodiments shown and described. In the description below, like reference numerals are used to describe the same, similar or corresponding parts in the several views of the drawings.

The terms "a" or "an", as used herein, are defined as one or more than one. The term "plurality", as used herein, is defined as two or more than two. The term "another", as used herein, is defined as at least a second or more. The terms "including" and/or "having", as used herein, are defined as comprising (i.e., open language). The term "coupled", as used herein, is defined as connected, although not necessarily directly, and not necessarily mechanically. The term "program" or "computer program" or similar terms, as used herein, is defined as a sequence of instructions designed for execution on a computer system. A "program", or "computer program", may include a subroutine, a function, a procedure, an object method, an object implementation, in an executable application, an applet, a servlet, a source code, an object code, a shared library/dynamic load library and/or other sequence of instructions designed for execution on a computer system. The term "processor", "controller", "CPU", "Computer" and the like as used herein encompasses both hard programmed, special purpose, general purpose and programmable devices and may encompass a plurality of such devices or a single device in either a distributed or centralized configuration without limitation.

The term "program", as used herein, may also be used in a second context (the above definition being for the first context). In the second context, the term is used in the sense of a "television program". In this context, the term is used to mean any coherent sequence of audio video content such as those which would be interpreted as and reported in an electronic program guide (EPG) as a single television program, without regard for whether the content is a movie, sporting event, segment of a multi-part series, news broadcast, etc. The term may also be interpreted to encompass commercial spots and other program-like content which may not be reported as a program in an electronic program guide.

Reference throughout this document to "one embodiment", "certain embodiments", "an embodiment", "an example", "an implementation" or similar terms means that a particular feature, structure, or characteristic described in connection with the embodiment, example or implementation is included in at least one embodiment, example or implementation of the present invention. Thus, the appearances of such phrases or in various places throughout this specification are not necessarily all referring to the same embodiment, example or implementation. Furthermore, the particular features, structures, or characteristics may be combined in any suitable manner in one or more embodiments, examples or implementations without limitation.

The term "or" as used herein is to be interpreted as an inclusive or meaning any one or any combination. Therefore, "A, B or C" means "any of the following: A; B; C; A and B; A and C; B and C; A, B and C". An exception to this definition will occur only when a combination of elements, functions, steps or acts are in some way inherently mutually exclusive.

The terms "program" and "television program" and similar terms can be interpreted in the normal conversational sense, as well as a meaning where the term means any segment of A/V content that can be displayed on a television set or similar monitor device. The term "legacy" as used herein refers to existing technology used for existing cable and satellite systems. The exemplary embodiments disclosed herein are decoded by a television Set-Top Box (STB), but it is contemplated that such technology will soon be incorporated within television receivers of all types whether housed in a separate enclosure alone or in conjunction with recording and/or playback equipment or Conditional Access (CA) decryption module or within a television set itself. The term "package medium" and similar terms as used herein are intended to embrace a recording medium such as a Digital Versatile Disc (DVD), Compact Disc (CD), BluRay (BR) discs or other magnetic, optical or other recorded medium that is generally merchandised as a package that contains the electronic storage medium and is sold as a retail commodity, as contrasted to an electronically downloadable data stream.

The present invention utilizes multiple segment identifiers (which in certain implementations can be implemented as Packet Identifiers or PIDs, while in other implementations using Internet Protocol (IP) packets the segments can be identified using one of IP address and port numbers, and content identification fields within IP packets) associated with a single item of content and substitute content associated therewith as a mechanism to provide content substitution using multiple content formats. Content substitution can be used to provide an enhanced level of customization of television programming in any number of ways. For example, content substitution can be used to provide targeted advertising to an audience by substitution of one advertisement for another. Content substitution can also be used to provide multiple endings, plots or other segments for a program, or to provide multiple views in a sportscast or other program. Other applications for the content substitution of the present invention will be discussed during the course of this discussion. Each of these applications, as well as others, can be facilitated using the present invention without need for dramatic increases in bandwidth and at reasonable cost for the hardware.

Examples used herein focus on substitution of advertisement content, but the invention is not limited thereto since any substitute content may fall within the scope of implementations and embodiments thereof.

Referring now to FIG. 1, a content substitution enabled video system 100 consistent with certain implementations of the present invention is shown in which a service provider 104 receives entertainment content 108 and advertisement content 112 from any of a number of sources in any number of encrypted or unencrypted formats. In this example, but many variants are possible, the service provider's site 104 includes encoders 116 to encode the content (ad or entertainment) in the manner to be described. In other embodiments, the content can be pre-encoded. The encoders 116 may utilize user profiles from a user profile database 120 to determine which advertisements may be suitable for various users.

In accord with certain embodiments, the present example utilizes more efficient encoding for the ad content than that used for the entertainment content so that multiple ads can be provided with minimal impact on the bandwidth consumed in the transport stream or Internet Protocol stream used to carry the content. In one example, on example segment of the entertainment content is encoded with high definition (HD) MPEG 2 encoding which is widely compatible with most receiver systems. The ad content, may include multiple substitutable advertisements including a default ad that uses the same MPEG2 encoding.

As an aside, MPEG2 is important in terrestrial broadcasts since it is part of the ATSC standard. The ATSC 2.0 standard has standardized both MPEG2 and AVC. However to be backward compatible to the entire legacy digital TVs in the U.S., MPEG2 should be supported for a very long time making it difficult for a broadcaster to support new codecs.

The ad may be encoded at a lower resolution or as standard definition (SD) to conserve bandwidth and to save storage on the personal video recorder (PVR). Alternate advertisements can be encoded with a more advanced encoding method such as the AVC encoding method to greatly conserve bandwidth, and can either be encoded as SD or HD format content. It is therefore possible that the alternate ad may even decode to a higher resolution than the main program content. However, if AVC SD encoding is used, approximately five to six times as much substitutable content can be inserted without substantial sacrifice of bandwidth as compared to MPEG2 HD.

The content stream, as will be discussed in greater detail later, is then sent via a network such as a cable or satellite television network or the Internet 124 for delivery to a receiver or content player device such as a digital television set or set top box (STB) shown generally as 130. When the content is received at 130 at a receiver/tuner 134, a selected transport or Internet Protocol (IP) stream is processed under control of a controller that incorporates or operates in conjunction with a state machine and is depicted generally as 138.

The service provider 104 can provide (or the user can program) preferences that are based on a user's profile in profile database 120 a mapping of content segment identifiers values that are to be used to select various advertisements that are targeted at the particular user profile. The segment identifiers can be transport packet IDs (PIDs) or IP addresses (IP number+port number) or content labels within an IP packet. In some scenarios, transport packets are delivered within IP packets. In which case either the PID values of the transport packets or IP addresses may be used. If a user wishes to select advertisements, he can enter preferences into the profile so as to skew the advertisements to those that are most likely of interest. The content segment identifiers for the particular item of content are then stored in a look-up table 142. So, for example, if the main portion of the video content is located at segment identifier 100, this segment identifier 100 is stored at 146 as the primary segment identifier. Secondary content that is suitable for the particular user is stored at 150 as a secondary segment identifier that is associated with the primary segment identifier. Hence, a set of ads suitable for the present user may be identified as segment identifier 103. In this case, segment identifier 103 is associated with segment identifier 100 in the content stream, and whenever an advertisement is encountered having segment identifier 103 the ad is inserted in place of the default advertisement.

In this case, if we assume that ads with segment identifier 103 are substituted for the current ad, the controller 134 can determine that this is the case by encountering a substitution point (e.g., a packet identified with segment identifier 103 in the content stream). The substitution is carried out starting at a segment number identified in the substitute content. Thus, in this embodiment, the substitute ad content should arrive earlier than the default ad content.

The main content, under control of controller 138, passes through a switch 160 such that the entertainment content (and default advertisement) passes through an MPEG-2 decoder 164 (in this example), and then through switch 168 to decryption circuitry and other video processing circuits depicted generally as 174.

Additionally, since the substitute content uses more advanced encoding such as AVC encoding, when the substitution point is reached, controller 138 causes switches 160 and 168 to divert the content to an AVC decoder (or other suitable decoder) 178 where the substitute content is decoded until it is complete, at which point the controller 138 switches back to the normal decoder 164.

It should be noted that the present embodiment depicts switches 160 and 168 in conjunction with a pair of decoders 164 and 178 to accomplish the diversion to an appropriate decoding scheme. However, those skilled in the art will appreciate that a single decoder device can be programmed or configured to carry out multiple types of decoding. This is symbolically indicated by the dashed box 184 which would represent a single multi-function decoder that is simply switched from operation in a first decoding mode to operating in a second decoding mode. It will also be clear upon consideration of the present teachings that the first and second decoding modes are not limited to MPEG-2 and AVC as shown in the example, or the HD and SD as discussed.

In general, the substitutable content is received at 134 having portions identified by multiple segment identifiers (e.g., segment identifier A and segment identifier B for example), which represent multiple possibilities for the content (e.g., multiple advertisements, logos, plots, endings, characters, etc.). This content could be received as a stream of content (as in a cable or satellite television transmission) or could be present in packaged media or a downloaded file. In any case, a processing operation (such as playback or transmission of the content) is initiated, generally using a main portion of the content designated with a particular primary segment identifier. The content is examined to determine if a prescribed substitution criterion has been met—in this case presence of an associated segment identifier in the look up table 142, and that an insertion point has been encountered.

If the criterion is not met, the processing of the main content continues until the criterion is met, at which point a content substitution is carried out and the decoder 184 is switched to another mode of operation, or a secondary decoder is substituted for the primary decoder (178 substituted for 164). The content substitution operations described herein can include operation in an insertion/deletion mode as described in the publication noted above and as will be described further below. Such substitution may entail a remapping of the segment identifier values so that a decoder or other processor merely continues processing content with the same segment identifier. Alternately, a decoder can be programmed to select the substituted content, when present, in preference to the main content.

In accordance with this process, for example, a local cable operator can receive a program that contains multiple sets of advertisements (commercials). Depending on the geographic location of the local operator, the main content can be retransmitted along with an appropriate one of several regional advertisements that are more appropriate to the geographic location or marketplace of the local cable operator. In another example, a movie with multiple selectable endings can be broadcast from a cable operator to its subscribers. The subscriber can then decide, before or during the viewing of the movie, which ending is preferred and make a selection. The subscriber sends a command to the STB which selects the alternative ending desired by the subscriber by selecting the ending associated with a particular segment identifier and remapping that segment identifier to the main program's segment identifier. Numerous other examples will occur to those skilled in the art upon consideration of the present teachings.

At the content provider head end, Program Specific Information (PSI) and Program Map Tables (PMT) are inserted into the stream of content for use by the decoding side in decoding the programming If the content is to be encrypted, it may be passed through an encrypter prior to modulation at a modulator (such as a QAM modulator). The modulated stream of content is then transmitted via the cable plant to the end users with decoder boxes such as Set-top boxes or digital television sets. The operation of the cable head end, including but not limited, to the segment identifier mapping for content substitution, may be carried out under control of a control computer.

Such a system can be used to form a content substitution encoder consistent with certain embodiments of the invention in which input data are received representing main content and representing substitution content. A segment packet identifier mapper assigns a primary segment identifier to the main content and assigns secondary segment identifiers to the substitution content. A private data generator may be used to generate user private data that identifies the main content by the primary segment identifier and substitution content by the secondary segment identifiers. The private data, the main content mapped to the primary segment identifier and the substitution content mapped to the secondary segment identifier are then assembled into a data stream.

Figure 2:
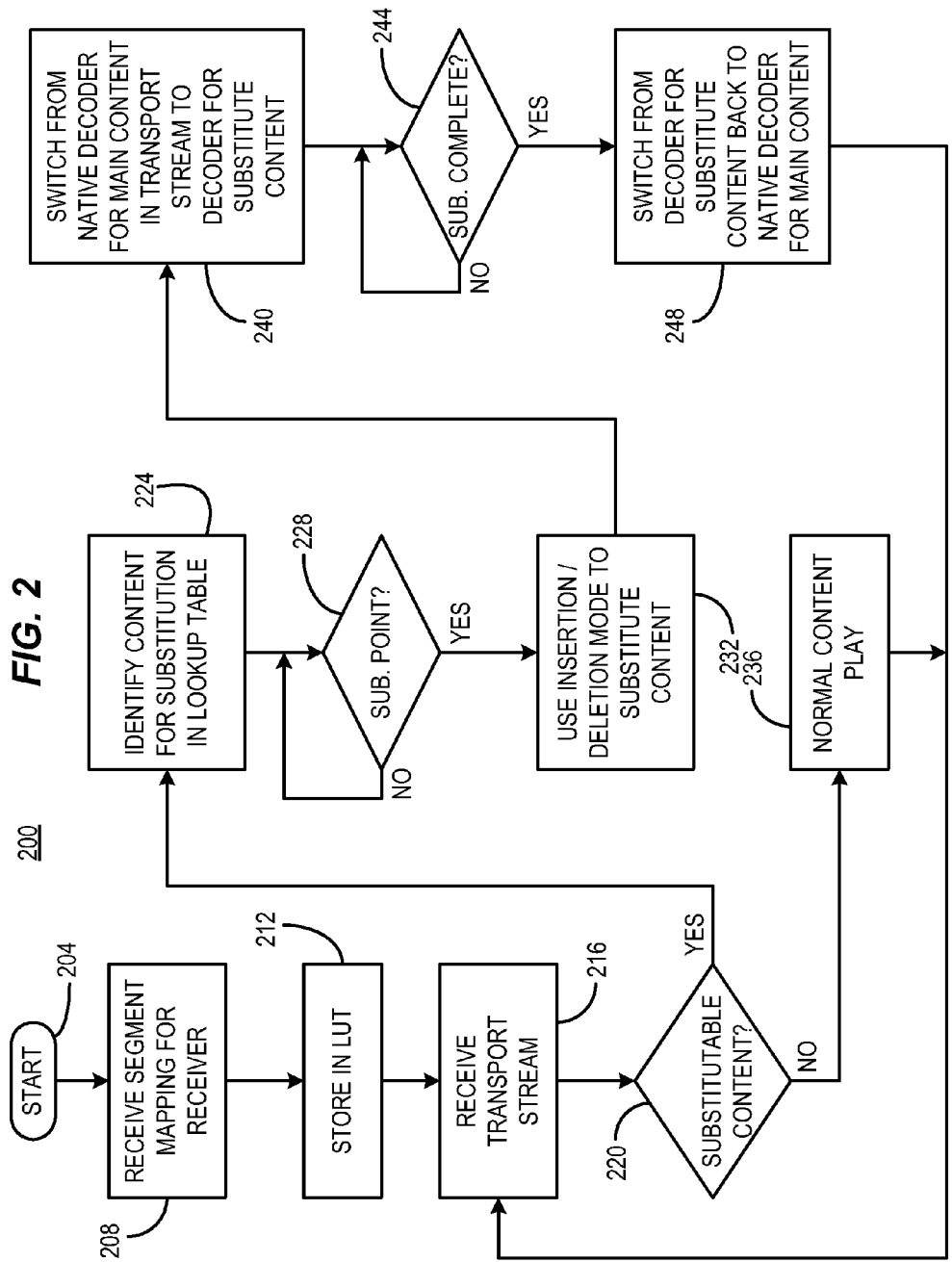
FIG. 2 is a flow chart of an example implementation of a process consistent with certain embodiments of the present invention.

Referring now to FIG. 2, an exemplary process for carrying out the content substitution is depicted as process 200 starting at 204. In this example process, segment identifier mapping information is received from the content provider at 208 relating the substitute content segment identifiers to the main content segment identifiers for a particular user based upon a user profile, for example. (The user can provide input that helps to determine the nature of the substitute content including maximum rating, interests, etc.). Once received, the segment identifier mappings are stored at 212 in the look-up table 142 as previously described so that when appropriate substitute content is received it can be substituted on the basis of the look-up table data.

When a transport stream is received at 216, it is examined at 220 by the controller 138 to determine if it contains substitutable content by reference to the look-up table 142. When substitutable content is identified by an appropriate segment identifier in the look-up table 142 at 224 and a substitution point is reached at 228 (which may be determined by the time or segment counter for the first segment of the substitute content), the state machine and controller 138 enters the insertion/deletion mode to substitute the content at 232. When no substitutable content is identified at 220, normal play continues at 236 which results in the default ad or other content to play along with the main content.

Once in the insertion/deletion mode is entered, the decoder is switched from its normal mode as used for the main content (either by redirecting the stream or by a change in operational mode) at 240 to the decoder or decoder mode appropriate for the substitute content. When the controller 138 determines that the substitution is complete (e.g., by a time code, segment count, flag, data in the adaptation field, or other technique) at 244, the decoder is switched at 248 back to the native decoder for the main content and control returns to 216 for further receipt of the transport stream (which is actually occurring near continuously, but is shown at 216 for convenience).

The description above largely assumes that the substitutable content is to be inserted at the cable system head end, but those skilled in the art will appreciate that the present content substitution concept can be implemented in many ways to permit content substitution at multiple levels to serve multiple purposes. For example, if the cable customer is viewing an interactive television show, the customer's selections (e.g., from a remote controller) can be used to establish the criterion for selection of a particular substitution (e.g., ending selection). However, the cable head end can also implement a content substitution in accord with certain embodiments consistent with the present invention, for example, by substitution of a local advertisement for a national advertisement or substitution of (or addition of) a local channel logo for a national logo.

Figure 3:
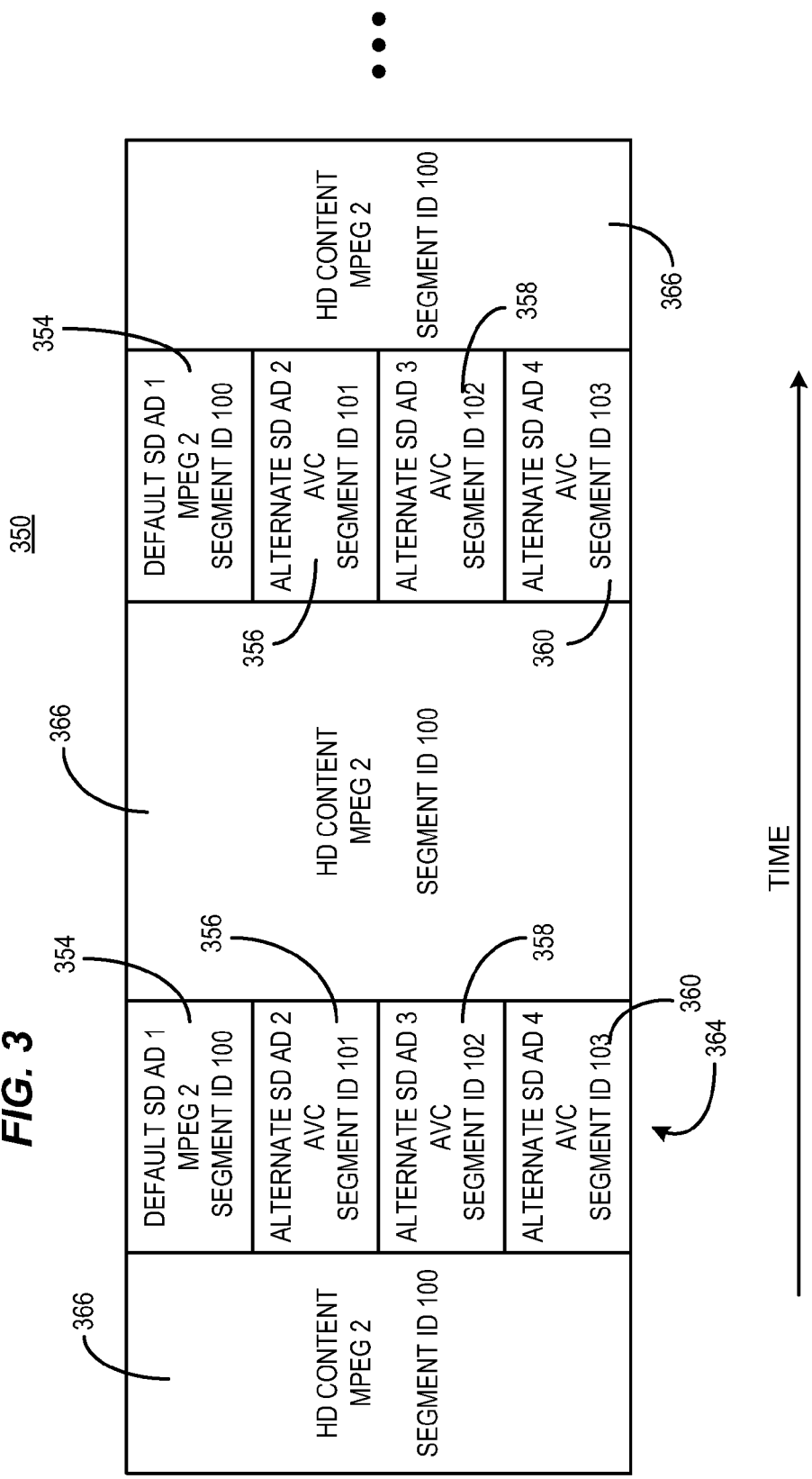
FIG. 3 is an example of a segment of a transport stream including substitutable content consistent with certain embodiments of the present invention.

FIG. 3 is representative of a stream of content (i.e., a TV program, sporting event, movie or the like) 350 that includes four separate advertisements 354, 356 and 358 and 360 (collectively 364) along with main content 366. While depicted in parallel (stacked in the figure), content 364 is arranged time sequentially, preferably in a segment interwoven arrangement during the time slot allocated for the substitute content. Note that the same set of ads (by reference number) are depicted twice in this illustration, but they may in fact contain different ad or substitute content with the same segment identifier that is to occur at a later time or sequence in the programming.

Consider now an exemplary embodiment consistent with the present invention in which a content provider wishes to provide alternative advertisements to several groups of customers, for example in a cable television system. In this example, assume that the cable television customers can be divided into three categories based upon, for example, a customer profile stored at the cable system's head end. Now, with further reference to FIG. 3, an example segment routing state machine that provides an insertion/deletion mode based upon segment identifiers is used in conjunction with multiple encoding types for the exemplary substitute content. U.S. Patent Application Publication number US2009/0022165-A1 provides a more detailed explanation of the operation of such a state machine which is hereby incorporated by reference. Exemplary television program 350 with the four separate advertisements 354, 356, 358 and 360 associated therewith is depicted. In order to segregate the four advertisements, three separate sets of segment identifiers are utilized (for simplicity, assume that there is one segment identifier per advertisement except for the default advertisement retained for compatibility with legacy receivers). In the case of the main advertisement 354 directed to one viewing audience, the advertisement 354 can share the same segment identifier (e.g., 100) with the program content.

The first alternative advertisement 356 is identified by an alternative segment identifier (e.g., segment identifier 101), and the second alternative advertisement is identified by another alternative segment identifier (e.g., segment identifier 102), and the third alternative advertisement is identified by another alternative segment identifier (e.g., segment identifier 103). Thus, in order to present the main advertisement, no special instructions need to be conveyed to the decoder (e.g., the television STB) since it is shared with the program content and will be shown by default. For decoders that are to decode the alternative advertisement 356, an instruction is sent from the cable system head end to the decoders instructing them to substitute content with segment identifier 101 whenever this segment identifier is encountered for segment identifier 100. Similarly, for decoders that are to decode the alternative advertisement 358, an instruction is sent from the cable system head end to the decoders instructing them to substitute content with segment identifier 102 whenever this segment identifier is encountered in place of segment identifier 100. In one embodiment, each packed of video data having segment identifier 100 has a corresponding segment with segment identifier 101 and segment identifier 102. In other embodiments, a one for one correlation is not required. In any event, segment counts should be maintained in a manner that permits the proper ordered processing of segments at the decoder.

In this example, the content is displayed stacked to illustrate the direct substitution that is the nature of the process. However, the content may be arranged as a sequence of segments which systematically present the main content followed by the first alternative content and then the second alternative content and then the sequence repeats. In various embodiments, corresponding segments with primary and secondary segment identifiers may appear in order of primary followed by secondary or secondary followed by primary. Alternation of the segments avoids unnecessary delays in segment receipt and helps preserve the order of segments. Where a one for one correlation between primary and secondary segment exists, each of the primary and secondary segments may retain a segment number that is used to establish the order of presentation. But, for the insertion/deletion mode, the segment numbering should be altered by the decoding process to retain order in the received content. Other embodiments are also possible without deviating from the present invention.

In addition to providing targeted advertisement for sets of customers by the cable system, a similar technique can be implemented to provide networks with the ability to provide regional advertisement by embedding, for example, multiple regional advertisements into a single data stream and using a remapping of the segment identifiers at the local networks or cable operators to select the appropriate advertisement for a given region. Thus, the four advertisements depicted in FIG. 3 could equally well represent four regional advertisements such as one for the East coast of the U.S., one for the central portion of the U.S., one for the West coast of the U.S. and one for local advertisers, or any other suitable regional segregation with more or less alternative advertisements.

Turning now to FIG. 4, a state diagram is shown which depicts one mechanism for implementing a controller state machine and a decoder that decodes the transport stream with multiple segment identifiers consistent with certain embodiments of the present invention. The numbered paths of the state diagram are explained in the table below:

STATE TABLE

| PATH NUMBER | CONDITIONS |
| --- | --- |
| 450 | Transition from initialization state |
| 452 | segment = A: Queue Packet |
| 454 | (segment = B, Mode = 2): segment = A: Queue Segment |
| 456 | (segment = B, Mode = 1): segment = A: Queue Segment |
| 458 | segment = A: segment = NULL |
| 460 | (segment = B, Queue_on_Error): Error_IRQn |
| 462 | (segment = B, Queue_on_Error): segment = A: Queue Packet: Error_IRQn |
| 464 | Decode_RSTn + MPEG Transport Error |
| 466 | segment = B: segment = A: Queue Segment |
| 468 | segment = B: segment = A: Queue Segment |
| 470 | Decode_RSTn + MPEG Transport Error |
| 472 | segment = A: segment = NULL |
| 474 | segment = B: segment = A: Queue Segment |
| 476 | segment = A: segment = NULL |
| 478 | Decode_RSTn + MPEG Transport Error |

While the entire state machine is depicted in FIG. 4, insertion/deletion mode 500 is of greatest interest. Reference is again made to the above-related U.S. patent publication for more extensive details of the operation of this state machine. The replacement of the primary segment by the secondary segment is called "Substitution Mode". Secondary segments may be inserted into the stream without replacement of a primary segment. This mode is called "Insertion Mode." In fact, the decoder may be used in a mode where both operations are active at the same time. This is called "Insertion and Deletion Mode". All three discrete decoder modes are mutually exclusive and follow a series of state transitions that are specific to each mode. The active mode is signaled through the decoder specific variable mode. If the value of mode is set to zero, decoding is not enabled and the transport decoder state machine is bypassed. If the value of mode is invalid (not a specifically defined state, then the same actions are taken as if mode was set to zero, i.e. the transport decoder state machine is bypassed. The definition of the state transitions for each mode is detailed as followed.

The algorithm for decoding an encoded transport stream is embodied in the state machine of FIG. 4. The Petri net showing the states and the state equations/actions can be derived from FIG. 4 in combination with the above state table. The algorithm has four operating states, with the system predominantly remaining is state 1. State 2 is entered only when a segment containing a shadow segment (not the main segment) has been encountered. Depending upon the system mode, as established through messaging in the PSI from the headend, different paths to two entirely different second states can be taken.

The state machine can be implemented in either hardware or software, depending upon the IC manufacturer's device architecture. A software implementation on a programmed processor can generally be expected to provide more flexibility in the design.

One error case identified (illegal state transition). This error is a unique error that is in addition to MPEG transport layer errors like continuity count, transport error, etc. Error_IRQn is the detection of two adjacent shadow segments without an intervening legacy segment, with n representing the number of the specific decoder. Depending upon the setting of the decoder specific variable queue_on_error, two different operations can occur. If the variable is set to true, the decoder will process the second shadow segment (segment=B) as in the non-error case. If the variable is set to false, the second shadow segment is discarded.

Whenever segments are inserted or deleted, in the case of Transport Stream packets, the continuity count (CC) of the primary stream (segment=A), will be preserved by adjusting the CC as appropriate. The decode_RSTn variable is a non-latching bit that can be set through a configuration register or accessed by other functions to force the decoder state machine n to a known state.

One mode of operation of the decoder transport processing algorithm is referred to as the Substitution Mode. In this mode segments having substitute segments—say segment B—are inserted into the transport stream by replacement of segment B with segment A to produce segment for an MPEG compliant stream with the desired content segments containing a segment field matching A, where A is a 13 bit value previously defined in a configuration register of the decoder. A "no operation" is carried out for segment A packets. In the "home" state, state 1, A segments become segments such are sent to the transport filter output queue for further processing, such as A/V decompression and display. In mode 1, the decoder state machine transitions from state 1 to state 2A upon reception of a MPEG segment with the segment field matching B, after receipt of a substitution flag 520. B is a 13 bit value previously defined in a configuration register of the decoder. B represents the secondary or "shadow" segment to be substituted for the next occurring legacy segment with segment matching A. The segment value of the B packet is changed to A before insertion into the stream. The substitution occurs because upon transition to state 2A, the B segment content is sent to the transport filter output queue.

The return to state 1 occurs when the next A segment is received. In this case, it is not queued and is converted to the NULL (0x1fff) segment value, effectively erasing it from the stream without altering the overall stream timing as would have occurred if it were physically removed. The return to state 1 can also be signaled by receipt of another substitution flag 524 indicating termination of the substitute mode.

Another mode of operation of the decoder transport processing algorithm is referred to as the Insertion Mode. For an MPEG compliant transport stream with the desired content segments containing a segment field matching A, where A is a 13 bit value previously defined in a configuration register of the decoder. In the "home" state, state 1, A segments are sent to the transport filter output queue for further processing, such as A/V decompression and display. In mode 2, the decoder state machine never transitions from state 1. Upon reception of a MPEG segment with the segment field matching B, where B is a 13 bit value previously defined in a configuration register of the decoder, B represents the secondary or "shadow" segment to be inserted into the stream with the segment value changed to A. In this mode, transition from state 1 to state 2B can occur due to receipt of an insertion flag 530. Segment B packets such as 534 and 536 are inserted into the stream as segment A packets such as 538 and 540. The insertion mode can terminate by receipt of the next insertion flag 544.

The decoder stream processing algorithm for the Insertion/Deletion Mode for a MPEG compliant transport stream with the desired content segments containing a segment field matching A, where A is a 13 bit value previously defined in a configuration register of the decoder. In the "home" state, state 1, A packets are sent to the transport filter output queue for further processing, such as A/V decompression and display. In mode 4, the decoder state machine transitions from state 1 to state 2B upon reception of a MPEG packet with the segment field matching B, where B is a 13 bit value previously defined in a configuration register of the decoder, B represents the secondary or "shadow" packet to be inserted with segment changed to match A. Any packet received while in state 2B with the segment value matching A will result in a transition to state 3 and the segment identifier changed to NULL, effectively removing it from the transport stream. All subsequent packets received with segment identifier matching A while in state 3 will result in their segment identifier value also being changed to NULL. Transition to and from state 1 can be initiated and terminated by an insertion/deletion flags respectively. While in state 3, segments with segment identifier B are converted to packets with segment identifier A such.

The return to state 2B occurs when the next segment with a B segment value is received and it is queued and converted to the A segment value. Likewise, return to the return to state 1 from state 2B occurs when the next packet with a B segment value is received accordingly, it is also queued and converted to the A segment value.

In methods consistent with the present invention, private signaling can be used to select a unit of content on the secondary segment while receiving content with the primary segment. Alternatively, private signaling can be used to select multiple units of content with the secondary segment while discarding units of content with the primary segment. Similarly, private signaling can be used to select multiple units of content with a secondary segment while receiving units of content with the primary segment. Also, private signaling can be used to switch from a mode of selecting multiple units of content with the secondary segment while discarding units of content with the primary segment to a mode of selecting multiple units of content with the secondary segment while receiving content with the primary segment. Private signaling can also be used to switch from a mode of selecting multiple units of content with the secondary segment and receiving multiple units of content with the primary segment to a mode of selecting multiple units of content with the secondary segment while discarding units of content with the primary segment.

A unit of content with the secondary segment is sent before or after a corresponding unit of content with the primary segment. In the case of Transport Streams, substitution operations can be initiated and terminated by private signaling forming part of an adaptation layer of packets in a data stream. The adaptation layer can be in a packet with the secondary segment, the primary segment or another segment.

For reference, the discussion below refers to transport stream packets where the content segment identifiers are packet IDs (PIDs). The following two tables are provided which call out the syntax used for an MPEG transport packet and an MPEG transport stream adaptation field respectively:

| TRANSPORT PACKET | | |
|---|---|---|
| Syntax | No. of bits | Mnemonic |
| transport_packet( ){ | | |
|     sync_byte | 8 | bslbf |
|     transport_error_indicator | 1 | bslbf |
|     payload_unit_start_indicator | 1 | bslbf |
|     transport_priority | 1 | bslbf |
|     PID | 13 | uimsbf |
|     transport_scrambling_control | 2 | bslbf |
|     adaptation_field_control | 2 | bslbf |
|     continuity_counter | 4 | uimsbf |
|     if(adaptation_field_control == '10' \|\| | | |
|     adaptation_field_control = | | |
| = '11'){ | | |
|         adaptation_field( ) | | |
|     } | | |
|     if(adaptation_field_control == '01' \|\| | | |
|     adaptation_field_control = | | |
| = '11') { | | |
|         for (i = 0; i < N; I++){ | | |
|             data_byte | 8 | bslbf |
|         } | | |
|     } | | |
| } | | |

| TRANSPORT STREAM ADAPTATION FIELD | | | |
|---|---|---|---|
| Syntax | No. of bits | Value | Mnemonic |
| adaptation_field( ) { | | | |
|   adaptation_field_length | 8 | | uimsbf |
|   if (adaptation_field_length = 0) { | | | |
|     discontinuity_indicator | 1 | x | bslbf |
|     random_access_indicator | 1 | x | bslbf |
|     elementary_stream_priority_indicator | 1 | 0 | bslbf |
|     PCR_Flag | 1 | 0 | bslbf |
|     OPCR_flag | 1 | 0 | bslbf |
|     splicing_point_flag | 1 | 0 | bslbf |
|     transport_private_data_flag | 1 | 1 | bslbf |
|     adaptation_field_extension_flag | 1 | | bslbf |
|     if (PCR_flag == '1') { | | | |
|       Program_clock_reference_base | 33 | N/A | uimsbf |
|       Reserved | 6 | | bslbf |
|       Program_clock_reference_extension | 9 | | uimsbf |
|     } | | | |
|     if (OPCR_flag = = '1') { | | | |
|       Original_program_clock_reference_base | 33 | N/A | uimsbf |
|       Reserved | 6 | | bslbf |
|       Original_program_clock_reference_extension | 9 | | uimsbf |
|     } | | | |
|     if (splicing_point_flag = = '1') { | | N/A | |
|       splice_countdown | 8 | | uimsbf |
|     } | | | |
|     if (transport_private_data_flag = = '1') { | | | |
|       transport_private_data_length | 8 | | uimsbf |
|       for (i = 0; i = transport_private_data_length; i==) { | | | |
|         private_data_byte | 8 | | bslbf |
|       } | | | |
|     } | | | |
|     if (adaptation_field_extension_flag = = '1') { | | N/A | |
|       adaptation_field_extension_length | 8 | | uimsbf |
|       ltw_flag | 1 | | bslbf |
|       piecewise_rate_flag | 1 | | bslbf |
|       seamless_splice_flag | 1 | | bslbf |
|       Reserved | 5 | | bslbf |
|       if (ltw_flag = = '1') { | | | |
|         Ltw_valid_flag | 1 | | bslbf |
|         Ltw_offset | 15 | | uimsbf |
|       } | | | |
|       if (piecewise_rate_flag = = '1') { | | | |
|         Reserved | 2 | N/A | bslbf |
|         Piecewise_rate | 22 | | uimsbf |
|       } | | | |
|       if (seamless_splice_flag = = '1') { | | | |
|         splice_type | 4 | N/A | bslbf |
|         DTS_next_AU[32..30] | 3 | | bslbf |

-continued

| TRANSPORT STREAM ADAPTATION FIELD | | | |
|---|---|---|---|
| Syntax | No. of bits | Value | Mnemonic |
|       marker_bit | 1 | | bslbf |
|       DTS_next_AU[29..15] | 15 | | bslbf |
|       marker_bit | 1 | | bslbf |
|       DTS_next_AU[14..0] | 15 | | bslbf |
|       marker_bit | 1 | | bslbf |
|     } | | | |
|     for (i = 0; i = N; i= =) { | | | |
|       Reserved | 8 | N/A | bslbf |
|     } | | | |
|   } | | | |
|   for (i = 0; i = N; i= =) { | | | |
|     Stuffing_byte | 8 | | bslbf |
|   } | | | |
| } | | | |
| } | | | |

Much of the information used to configure and control the decoder module comes from the MPEG PSI data contained in the transport stream and decoded by the STB middleware. Configuration and control can be achieved using extensions to the MPEG PSI specification specific to the current decoder when needed. In certain embodiments consistent with the present invention, the following table defines the extensions used and the private data syntax.

| PRIVATE DATA SYNTAX | | |
|---|---|---|
| Syntax | No. of bits | Mnemonic |
| transport_private_data( ) { | | |
|   if (transport_private_data_length > 0) { | | |
|     Decoder application | 16 | uimsbf |
|     Decoder mode | 16 | uimsbf |
|     if (Decoder application == '1') { | | |
|       Reserved | 13 | bslbf |
|       Decoder mode_3    (Multi-to-One Insertion & Deletion) | 1 | bslbf |
|       Decoder mode_2    (One-to-One Insertion) | 1 | bslbf |
|       Decoder mode_1    (One-to-One Substitution) | 1 | bslbf |
|     } | | |
|     /*** Multi-to-One Deletion & Insertion***/ | | |
|     if (Decoder application == '1' & Decoder mode = 3) { | | |
|       termination flag | 1 | uimsbf |
|       Reserved | 7 | uimsbf |
|       primary PID packets to delete (Optional) | 16 | uimsbf |
|       Length | 8 | uimsbf |
|       if (length > 0){ | | |
|         Reserved | 3 | uimsbf |
|         primary PID | 13 | uimsbf |
|         Reserved | 3 | uimsbf |
|         secondary PID | 13 | uimsbf |
|       } | | |
|     } | | |
|     /*** One-to-One Insertion***/ | | |
|     if (Decoder application == '1' & Decoder mode = 2) { | | |
|       termination flag | 1 | uimsbf |
|       Reserved | 7 | uimsbf |
|       Length | 8 | uimsbf |
|       if (length > 0){ | | |
|         Reserved | 3 | uimsbf |
|         primary PID | 13 | uimsbf |
|         Reserved | 3 | uimsbf |
|         secondary PID | 13 | uimsbf |
|       } | | |
|     } | | |
|     /*** One-to-One Substitution***/ | | |
|     if (Decoder application == '1' & Decoder mode = 1) { | | |
|       termination flag | 1 | uimsbf |
|       Reserved | 7 | uimsbf |
|       Length | 8 | uimsbf |
|       if (length > 0){ | | |
|         Reserved | 3 | uimsbf |
|         primary PID | 13 | uimsbf |
|         Reserved | 3 | uimsbf |
|         secondary PID | 13 | uimsbf |
|       } | | |
|     } | | |

PRIVATE DATA SYNTAX

| Syntax | No. of bits | Mnemonic |
|---|---|---|
|       } | | |
|    } | | |
| } | | |

It may be possible to use "adaptation and no payload" as well as "adaptation with payload" to signal transition between states. Adaptation field only packets whether A, B or C can be made "null", e.g. NOP, or can simply be left in the stream.

In this document, references to "registers", which may imply a hardware implementation, can be freely interchanged with "variable" in a software or microcoded implementation. In either case, a common decoder module command/control structure and interface is desirable to achieve middleware compatibility across STB platforms of varying architecture and capability.

In certain preferred implementations, each decoder module contains 19 registers (or variables). Unless otherwise stated, all registers are read/write, meaning that the current value can be read back through the same interface used to write. All registers will be sequentially offset from a common base value (origin). The addresses in this specification are all relative to the base (offset values). The registers can be mapped as shown in the table below:

REGISTER MAP

| Address | Name | Resources |
|---|---|---|
| 0x00 | Interrupt Register | Read/Write |
| 0x01 | Primary segment Register, Decoder 1 | Read/Write |
| 0x02 | Secondary segment Register, Decoder 1 | Read/Write |
| 0x03 | Primary segment Register, Decoder 2 | Read/Write |
| 0x04 | Secondary segment Register, Decoder 2 | Read/Write |
| 0x05 | Primary segment Register, Decoder 3 | Read/Write |
| 0x06 | Secondary segment Register, Decoder 3 | Read/Write |
| 0x07 | Primary segment Register, Decoder 4 | Read/Write |
| 0x08 | Secondary segment Register, Decoder 4 | Read/Write |
| 0x09 | Primary segment Register, Decoder 5 | Read/Write |
| 0x0A | Secondary segment Register, Decoder 5 | Read/Write |
| 0x0B | Primary segment Register, Decoder 6 | Read/Write |
| 0x0C | Secondary segment Register, Decoder 6 | Read/Write |
| 0x0D | Decoder 1 Mode Register | Read/Write |
| 0x0E | Decoder 2 Mode Register | Read/Write |
| 0x0F | Decoder 3 Mode Register | Read/Write |
| 0x10 | Decoder 4 Mode Register | Read/Write |
| 0x11 | Decoder 5 Mode Register | Read/Write |
| 0x12 | Decoder 6 Mode Register | Read/Write |
| 0x13 | Decoder Reset Register | Write |

Status registers are provided in accordance with the following table (Interrupt Source Register (Read Only)—Address: 0x00)

STATUS REGISTERS

| Bit | Name | Meaning |
|---|---|---|
| 15 | Decode_1_ERROR | Decoder 1 Consecutive Shadow Packets |
| 14 | Decode_2_ERROR | Decoder 2 Consecutive Shadow Packets |
| 13 | Decode_3_ERROR | Decoder 3 Consecutive Shadow Packets |
| 12 | Decode_4_ERROR | Decoder 4 Consecutive Shadow Packets |
| 11 | Decode_5_ERROR | Decoder 5 Consecutive Shadow Packets |
| 10 | Decode_6_ERROR | Decoder 6 Consecutive Shadow Packets |
| 9-0 | NA | Undefined |

If an interrupt is invoked, the associated bit will be set to "1". More than one bit may asserted simultaneously. If any bit is set, the decoder interrupts the host controller based upon the value of the mask register. The contents of the source register is bitwise ANDed with the mask register and the result logically ORed to form a single IRQ output. Interrupt Conditions are tabulated as follows Decode_n_ERROR Set on: Detection of two adjacent shadow segments without an intervening legacy segment.

Reset on: Read of interrupt status register.

A write only Interrupt Mask Register is at Address: 0x00. When an Interrupt Mask Register bit is "1", the associated interrupt is unmasked and when "0", it is masked. Masked interrupts will not generate an interrupt output to the host processor. The interrupt flag bit(s) of masked interrupts will still be valid in the interrupt register. The default power-up condition is for all interrupts to be masked (all "0's").

| Bit | Name | Meaning |
|---|---|---|
| 15 | Decode_1_ERROR | Decoder 1 Consecutive Shadow Packets |
| 14 | Decode_2_ERROR | Decoder 2 Consecutive Shadow Packets |
| 13 | Decode_3_ERROR | Decoder 3 Consecutive Shadow Packets |
| 12 | Decode_4_ERROR | Decoder 4 Consecutive Shadow Packets |
| 11 | Decode_5_ERROR | Decoder 5 Consecutive Shadow Packets |
| 10 | Decode_6_ERROR | Decoder 6 Consecutive Shadow Packets |
| 9-0 | NA | Undefined |

Configuration Registers are as above.

A primary segment register for Decoder 1 (Read/Write) appears at Address: 0x01 and is configured as follows.

| Bit | Name | Meaning |
|---|---|---|
| 15-13 | NA | Undefined |
| 12-0 | Primary_segment_1 | Packet ID value for Primary segment of Decoder 1 |

The Primary segment is a 13 bit value stored right justified as a big-endian (MSB in bit 12) value.

A secondary segment register Secondary segment Register for decoder 1 (Read/Write) appears at Address: 0x02 and is configured as follows:

| Bit | Name | Meaning |
| --- | --- | --- |
| 15-13 | NA | Undefined |
| 12-0 | Secondary_segment_1 | Packet ID value for secondary ("shadow") segment, Decoder 1 |

The Secondary segment is a 13 bit value stored right justified as a big-endian (MSB in bit 12) value as shown above.

A primary segment register, for Decoder 2 (Read/Write) appears at Address: 0x03 and is configured as follows:

| Bit | Name | Meaning |
| --- | --- | --- |
| 15-13 | NA | Undefined |
| 12-0 | Primary_segment_2 | Packet ID value for Primary segment of Decoder 2 |

The Primary segment is a 13 bit value stored right justified as a big-endian (MSB in bit 12) value.

A secondary segment register for decoder 2 (Read/Write) appears at Address: 0x04 and is configured as follows:

| Bit | Name | Meaning |
| --- | --- | --- |
| 15-13 | NA | Undefined |
| 12-0 | Secondary_segment_2 | Packet ID value for secondary ("shadow") segment, Decoder 2 |

The Secondary segment is a 13 bit value stored right justified as a big-endian (MSB in bit 12) value.

A primary segment register, for decoder 3 (Read/Write) appears at Address: 0x05 and is configured as follows:

| Bit | Name | Meaning |
| --- | --- | --- |
| 15-13 | NA | Undefined |
| 12-0 | Primary_segment_3 | Packet ID value for Primary segment of Decoder 3 |

The Primary segment is a 13 bit value stored right justified as a big-endian (MSB in bit 12) value.

A secondary segment register for decoder 3 (Read/Write) appears at Address: 0x06 and is configured as follows:

| Bit | Name | Meaning |
| --- | --- | --- |
| 15-13 | NA | Undefined |
| 12-0 | Secondary_segment_3 | Packet ID value for secondary ("shadow") segment, Decoder 3 |

The Secondary segment is a 13 bit value stored right justified as a big-endian (MSB in bit 12) value.

A primary segment register for decoder 4 (Read/Write) appears at Address: 0x07 and is configured as follows:

| Bit | Name | Meaning |
| --- | --- | --- |
| 15-13 | NA | Undefined |
| 12-0 | Primary_segment_4 | Packet ID value for Primary segment of Decoder 4 |

The Primary segment is a 13 bit value stored right justified as a big-endian (MSB in bit 12) value.

A secondary segment register for decoder 4 (Read/Write) appears at Address: 0x08 and is configured as follows:

| Bit | Name | Meaning |
| --- | --- | --- |
| 15-13 | NA | Undefined |
| 12-0 | Secondary_segment_4 | Packet ID value for secondary ("shadow") segment, Decoder 4 |

The Secondary segment is a 13 bit value stored right justified as a big-endian (MSB in bit 12) value.

A primary segment register for decoder 5 (Read/Write) appears at Address: 0x09 and is configured as follows:

| Bit | Name | Meaning |
| --- | --- | --- |
| 15-13 | NA | Undefined |
| 12-0 | Primary_segment_5 | Packet ID value for Primary segment of Decoder 5 |

The Primary segment is a 13 bit value stored right justified as a big-endian (MSB in bit 12) value.

A secondary segment register for decoder 5 (Read/Write) appears at Address: 0x0A and is configured as follows:

| Bit | Name | Meaning |
| --- | --- | --- |
| 15-13 | NA | Undefined |
| 12-0 | Secondary_segment_5 | Packet ID value for secondary ("shadow") segment, Decoder 5 |

The Secondary segment is a 13 bit value stored right justified as a big-endian (MSB in bit 12) value.

A primary segment register for decoder 6 (Read/Write) appears at Address: 0x0B and is configured as follows:

| Bit | Name | Meaning |
| --- | --- | --- |
| 15-13 | NA | Undefined |
| 12-0 | Primary_segment_6 | Packet ID value for Primary segment of Decoder 6 |

The Primary segment is a 13 bit value stored right justified as a big-endian (MSB in bit 12) value.

A secondary segment register for decoder 6 (Read/Write) appears at Address: 0x0C and is configured as follows:

| Bit | Name | Meaning |
| --- | --- | --- |
| 15-13 | NA | Undefined |
| 12-0 | Secondary_segment_6 | Packet ID value for secondary ("shadow") segment, Decoder 6 |

The Secondary segment is a 13 bit value stored right justified as a big-endian (MSB in bit 12) value.

The Decoder 1 mode register (Read/Write) appears at Address: 0x0D and is configured as follows:

| Bit | Name | Default Value | Meaning |
| --- | --- | --- | --- |
| 15-13 | Decoder_1_Mode | Off (0) | Determines decoder 1 operating mode |
| 12 | Queue_on_Error1 | Drop (0) | Determines whether to queue or drop consecutive shadow segments when in mode 1 (1 = queue) for decoder 1 |
| 11-0 | Undefined | NA | Undefined |

Mode definitions are as follows:
0: Bypass all decode processing, disable state machine
1: Substitution mode
2: Insertion Mode
4: Insertion & Deletion Mode
All other values: Bypass all decode processing, disable state machine The decoder 2 mode registers (Read/Write) appear at Address: 0x0E and are configured as follows:

| Bit | Name | Default Value | Meaning |
|---|---|---|---|
| 15-13 | Decoder_2_Mode | Off (0) | Determines decoder 2 operating mode |
| 12 | Queue_on_Error2 | Drop (0) | Determines whether to queue or drop consecutive shadow segments when in mode 1 (1 = queue) for decoder 2 |
| 11-0 | Undefined | NA | Undefined |

Mode definitions are as follows:
0: Bypass all decode processing, disable state machine
1: Substitution mode
2: Insertion Mode
4: Insertion & Deletion Mode
All other values: Bypass all decode processing, disable state machine The Decoder 3 mode register (Read/Write) is at Address: 0x0F and is configured as follows:

| Bit | Name | Default Value | Meaning |
|---|---|---|---|
| 15-13 | Decoder_3_Mode | Off (0) | Determines decoder 3 operating mode |
| 12 | Queue_on_Error3 | Drop (0) | Determines whether to queue or drop consecutive shadow segments when in mode 1 (1 = queue) for decoder 3 |
| 11-0 | Undefined | NA | Undefined |

Mode definitions are as follows:
0: Bypass all decode processing, disable state machine
1: Substitution mode
2: Insertion Mode
4: Insertion & Deletion Mode
All other values: Bypass all decode processing, disable state machine The Decoder 4 Mode Register (Read/Write) appears at Address: 0x10 and is configured as follows:

| Bit | Name | Default Value | Meaning |
|---|---|---|---|
| 15-13 | Decoder_4_Mode | Off (0) | Determines decoder 4 operating mode |
| 12 | Queue_on_Error4 | Drop (0) | Determines whether to queue or drop consecutive shadow segments when in mode 1 (1 = queue) for decoder 4 |
| 11-0 | Undefined | NA | Undefined |

Mode definitions are as follows:
0: Bypass all decode processing, disable state machine
1: Substitution mode
2: Insertion Mode
4: Insertion & Deletion Mode
All other values: Bypass all decode processing, disable state machine The Decoder 5 mode register (Read/Write) appears at Address: 0x11 and is configured as follows:

| Bit | Name | Default Value | Meaning |
|---|---|---|---|
| 15-13 | Decoder_5_Mode | Off (0) | Determines decoder 5 operating mode |
| 12 | Queue_on_Error5 | Drop (0) | Determines whether to queue or drop consecutive shadow segments when in mode 1 (1 = queue) for decoder 5 |
| 11-0 | Undefined | NA | Undefined |

Mode definitions are as follows:
0: Bypass all decode processing, disable state machine
1: Substitution mode
2: Insertion Mode
4: Insertion & Deletion Mode
All other values: Bypass all decode processing, disable state machine The Decoder 6 mode register (Read/Write) is at Address: 0x12 and is configured as follows:

| Bit | Name | Default Value | Meaning |
|---|---|---|---|
| 15-13 | Decoder_6_Mode | Off (0) | Determines decoder 6 operating mode |
| 12 | Queue_on_Error6 | Drop (0) | Determines whether to queue or drop consecutive shadow segments when in mode 1 (1 = queue) for decoder 6 |
| 11-0 | Undefined | NA | Undefined |

Mode definitions are as follows:
0: Bypass all decode processing, disable state machine
1: Substitution mode
2: Insertion Mode
4: Insertion & Deletion Mode
All other values: Bypass all decode processing, disable state machine The Decoder reset register (Write) is located at Address: 0x13 and is configured as follows:

| Bit | Name | Default Value | Meaning |
|---|---|---|---|
| 15 | Decoder_RST1 | Off (0) | Decoder 1 Non-latching reset to state 1 |
| 14 | Decoder_RST2 | Off (0) | Decoder 2 Non-latching reset to state 1 |
| 13 | Decoder_RST3 | Off (0) | Decoder 3 Non-latching reset to state 1 |
| 12 | Decoder_RST4 | Off (0) | Decoder 4 Non-latching reset to state 1 |
| 11 | Decoder_RST5 | Off (0) | Decoder 5 Non-latching reset to state 1 |
| 10 | Decoder_RST6 | Off (0) | Decoder 6 Non-latching reset to state 1 |
| 9-0 | Undefined | NA | NA |

There is one error case identified (illegal state transition). This error is a unique error and is in addition to MPEG transport layer errors like continuity count, transport error, etc. Error_IRQn is the detection of two adjacent shadow segments without an intervening legacy segment, with n representing the number of the specific decoder. Depending upon the setting of the decoder specific variable queue_on_error, two different operations can occur. If the variable is set to true, the decoder will process the second shadow segment (segment=B) as in the non-error case. If the variable is set to false, the second shadow segment is discarded.

In some instances, content that is to be replaced is placed on segment boundaries. Since some information may not fit neatly within the boundaries of a segment, some additional content, which is not specifically the content of interest may need to be duplicated to fill up the segment. In other cases, the segment can simply be filled with null bytes (e.g., all zeros). In the case of a Transport Stream using MPEG2 codec, a typical video slice contains approximately 3 to 8 packets (segments) depending upon how much intra-coded data is present. It is noted that some decoders may have difficulty with multiple slices on a single video line even though the MPEG2 specification allows for this.

It is also noted that there may be ending problems encountered if the substituted content is referenced from future frames. However, this can be resolved by establishing a rule that says that the substituted content cannot be referenced by past frames. This is due to the possibility that the content may be different depending upon the choice made by a customer or the set top box. Reference to future frames might be allowed if the reference is all contained within the substitute content. Also, since the encoder uses a specified set of quantization tables, substitute content should be processed using the same quantization table so that correct decoding can take place.

The present content substitution can be carried out either on line or off line depending upon the application, without limitation.

A decoder such as the above can be incorporated within a television STB or other television receiver and can be used to provide the end user with content substitution capabilities controlled either by the user or by the Multi-Service Operator (MSO).

Thus, in accord with certain implementations, a method of substitution of digital content at a content player device involves providing a segment of digital content having substitutable portions, the segment of digital content being encoded using a first encoding method; identifying a fixed segment of the digital content using a first segment identifier; providing a plurality of sets of substitute segments of digital content forming a part of the segment of digital content which are identified by a corresponding plurality of segment identifiers; determining that one of the plurality of segment identifiers correspond to the sets of segments of substitute content that are to be substituted by reference to a stored instruction stored in a memory device; determining that the content contains the one of the plurality of segment identifiers; and inserting the substitutable portion having the one of the plurality of segment identifiers and disregarding the substitutable portions not identified by the one of the plurality of segment identifiers.

In accord with certain implementations, a method of substitution of digital content (e.g., digital video) at a content player device involves providing a segment of digital content having substitutable portions, the segment of digital content being encoded using a first digital video encoding method; identifying a fixed segment of the digital content using a first segment identifier; providing a plurality of sets of substitute segments of digital content forming a part of the segment of digital content which are identified by a corresponding plurality of segment identifiers; where the plurality of sets of substitute segments of digital content are encoded using a second encoding method, where the second encoding method produces more highly compressed digital content than the first encoding method; determining that one of the plurality of segment identifiers correspond to the sets of segments of substitute content that are to be substituted by reference to a stored instruction stored in a memory device; determining that the content contains the one of the plurality of segment identifiers; inserting the substitutable portion having the one of the plurality of segment identifiers and disregarding the substitutable portions not identified by the one of the plurality of segment identifiers; and upon encountering a substitution point in the content, switching from a first decoder that decodes content encoded using the first encoding method to a second decoder that decodes content encoded using the second encoding method, and upon completion of decoding the inserted substituted portion switching from the second decoder back to the first decoder.

In certain implementations, the first and second decoders comprise a single programmable decoder that is switched from operation using a first decoding method to a second decoding method. In certain implementations, the decoder is switched by a segment routing state machine that operates an insertion/deletion mode based upon segment identifiers. In certain implementations, the first video encoding method comprises MPEG-2 encoding. In certain implementations, the second video encoding method comprises AVC encoding. In certain implementations, the content segments are sent as MPEG2 Transport Stream packets and identified using packet identifiers (PIDs) serving as segment identifiers. In certain implementations, the content segments are sent as Internet Protocol (IP) packets and identified using one of IP address and port numbers, and content identification fields within IP packets.

Another method of substitution of digital video content at a content player device involves providing a segment of video content having substitutable portions, the segment of video content being encoded using a first video encoding method; identifying a fixed segment of the video content using a first segment identifier; providing a plurality of sets of substitute segments of video content forming a part of the segment of video content which are identified by a corresponding plurality of segment identifiers; where the plurality of sets of substitute segments of video content are encoded using a second encoding method and sent ahead of the primary segments they would be replacing, where the second encoding method produces more highly compressed video content than the first encoding method; determining that one of the plurality of segment identifiers correspond to the sets of segments of substitute content that are to be substituted by reference to a stored instruction stored in a memory device; determining that the content contains the one of the plurality of segment identifiers; inserting the substitutable portion having the one of the plurality of segment identifiers and disregarding the substitutable portions not identified by the one of the plurality of segment identifiers; and upon encountering a substitution point in the content, switching from a first decoder that decodes content encoded using the first encoding method to a second decoder that decodes content encoded using the second encoding method, and upon completion of decoding the inserted substituted portion switching from the second decoder back to the first decoder.

Another method of substitution of digital video content at a content player device involves providing a segment of video content having substitutable portions, the segment of video content being encoded using a first video encoding method; identifying a fixed segment of the video content using a first segment identifier; providing a plurality of sets of substitute segments of video content forming a part of the segment of video content which are identified by a corresponding plurality of segment identifiers; where the plurality of sets of substitute segments of video content are encoded using a second encoding method, where the second encoding method produces more highly compressed video content than the first encoding method; determining that one of the plurality of segment identifiers correspond to the sets of segments of substitute content that are to be substituted by reference to a stored instruction stored in a memory device; determining that the content contains the one of the plurality of segment identifiers; inserting the substitutable portion having the one of the plurality of segment identifiers and disregarding the substitutable portions not identified by the one of the plurality of segment identifiers; upon encountering a substitution point in the content, switching from a first decoder that decodes content encoded using the first encoding method to a second decoder that decodes content encoded using the second encoding method, and upon completion of decoding the inserted substituted portion switching from the second decoder back to the first decoder, where the first and second decoders comprise a single programmable decoder that is switched from operating using a first decoding method to a second decoding method; and where the decoder is switched by a segment routing state machine that operates an insertion/deletion mode based upon segment identifiers.

In certain implementations, the first video encoding method comprises MPEG-2 encoding, and where the second video encoding method comprises AVC encoding.

A digital video content player device consistent with certain implementations has a video player that receives a segment of video content having substitutable portions, the segment of video content being encoded using a first video encoding method where the video content has a first fixed segment of the video content identified using a first segment identifier, and a plurality of sets of substitute segments of video content forming a part of the segment of video content which are identified by a corresponding plurality of segment identifiers; where the plurality of sets of substitute segments of video content are encoded using a second encoding method, where the second encoding method produces more highly compressed video content than the first encoding method. A memory table is stored in a memory device that stores one of the plurality of segment identifiers corresponding to the sets of segments of substitute content that are to be substituted. A segment routing state machine operates in an insertion/deletion mode based upon segment identifiers to determining that the content contains the one of the plurality of segment identifiers and inserts the substitutable portion having the one of the plurality of segment identifiers and disregarding the substitutable portions not identified by the one of the plurality of segment identifiers. A first decoder decodes content encoded using the first encoding method. A second decoder decodes content encoded using the second encoding method. A processor operates such that, upon encountering a substitution point in the content, switches from the first decoder that decodes content encoded using the first encoding method to the second decoder that decodes content encoded using the second encoding method, and upon completion of decoding the inserted substituted portion switching from the second decoder back to the first decoder.

In certain implementations, the first and second decoders comprise a single programmable decoder that is switched from a first decoding method to a second decoding method. In certain implementations, the first video encoding method comprises MPEG-2 encoding. In certain implementations, the second video encoding method comprises AVC encoding. In certain implementations, the content segments are sent as MPEG2 Transport Stream packets and identified using segment identifiers in the form of packet identifiers (PIDs). In certain implementations, the content segments are sent as Internet Protocol (IP) packets and identified using segment identifiers in the form of one of IP address and port numbers, and content identification fields within IP packets.

Those skilled in the art will recognize, upon consideration of the above teachings, that certain of the above exemplary embodiments are based upon use of a programmed processor while others may be based on hardware component equivalents such as special purpose hardware and/or dedicated processors. Similarly, general purpose computers, microprocessor based computers, micro-controllers, optical computers, analog computers, dedicated processors, application specific circuits and/or dedicated hard wired logic may be used to construct alternative equivalent embodiments.

Certain embodiments described herein, are or may be implemented using a programmed processor executing programming instructions that are broadly described above in flow chart form or as state machine definitions that can be stored on any suitable electronic or computer readable storage medium. However, those skilled in the art will appreciate, upon consideration of the present teaching, that the processes described above can be implemented in any number of variations and in many suitable programming languages without departing from embodiments of the present invention. For example, the order of certain operations carried out can often be varied, additional operations can be added or operations can be deleted without departing from certain embodiments of the invention. Error trapping can be added and/or enhanced and variations can be made in user interface and information presentation without departing from certain embodiments of the present invention. Such variations are contemplated and considered equivalent.

While certain illustrative embodiments have been described, it is evident that many alternatives, modifications, permutations and variations will become apparent to those skilled in the art in light of the foregoing description.

What is claimed is:

1. A method of substitution of digital content at a content player device, comprising:
   accessing a stream of digital content having substitutable portions, the stream of digital content being encoded using a first encoding method;
   identifying a segment the digital content using a first segment identifier; wherein
   a plurality of sets of substitute segments of digital content are associated with at least one part of the segment of digital content, identified by a corresponding plurality of segment identifiers;
   determining that one of the plurality of segment identifiers correspond to the sets segments of substitute content that are to be substituted;
   determining that the stream of digital content contains the one of the plurality of segment identifiers;
   inserting into the stream of digital content the substitutable portion having the one of the plurality of segment identifiers and disregarding the substitutable portions in the stream of digital content;
   wherein the plurality of sets of substitute segments of digital content are encoded using a second encoding method;
   upon determining a substitution point in the stream of digital content, switching from a first decoder that decodes content encoded using the first encoding method to a second decoder that decodes content encoded using the second encoding method; and
   upon completion of decoding the inserted substituted portion, switching from the second decoder back to the first decoder.

2. The method according to claim 1, where the first and second decoders comprise a single programmable decoder that is switched from operation using a first decoding method to a second decoding method.

3. The method according to claim 1, where the first digital encoding method comprises MPEG-2 encoding.

4. The method according to claim 1, where the second digital encoding method comprises AVC encoding.

5. The method according to claim 1, where the content segments are sent as MPEG-2 Transport Stream packets and identified using packet identifiers (PIDs) serving as segment identifiers.

6. The method according to claim 1, where the content segments are sent as Internet Protocol (IP) packets and identified using one of IP address and port numbers, and content identification fields within IP packets.

7. A method of substitution of digital content at a content player device, comprising:
- accessing a segment of digital content having substitutable portions, the segment of digital content being encoded using a first digital encoding method;
- identifying a fixed segment of the digital content using a first segment identifier;
- accessing a plurality of sets of substitute segments of digital content forming a part of the segment of digital content which are identified by a corresponding plurality of segment identifiers;
- where the plurality of sets substitute segments of digital content are encoded using a second encoding method and sent ahead of the primary segments they would be replacing, and
- where the second encoding method produces differently compressed digital content than the first encoding method;
- determining that one of the plurality of segment identifiers corresponds to the sets of segments of substitute content that are to be substituted by reference to a stored instruction stored in a memory device;
- determining that the content contains the one of the plurality of segment identifiers;
- inserting the substitutable portion having the one of the plurality of segment identifiers and disregarding the substitutable portions not identified by the one of the plurality of segment identifiers; and
- upon encountering a substitution point in the content, switching from a first decoder that decodes content encoded using the first encoding method to a second decoder that decodes content encoded using the second encoding method, and
- upon completion of decoding the inserted substituted portion, switching from the second decoder back to the first decoder.

8. A method of substitution of digital content at a content player device, comprising:
- accessing a stream of digital content having substitutable portions, the stream of digital content being encoded using a first digital encoding method;
- identifying a segment of the digital content using a first segment identifier;
- wherein a plurality of sets of substitute segments of digital content are associated with the segment of digital content which are identified by corresponding plurality of segment identifiers;
- where the plurality of sets of substitute segments of digital content are encoded using a second encoding method;
- determining that one of the plurality of segment identifiers correspond to the sets of segments of substitute content that are to be substituted;
- inserting the substitutable portion having the one of the plurality of segment identifiers and disregarding portions of the stream of digital content not identified by the on of the plurality of segment identifiers;
- upon encountering a substitution point in the stream of digital content, switching from a first decoder that decodes content encoded using the first encoding method to a second decoder that decodes content encoded using the second encoding method, and
- upon completion of decoding the inserted substituted portion switching from the second decoder back to the first decoder, and
- where the first and second decoders comprise a single programmable decoder that is switched from operating using a first decoding method to a second decoding method.

9. The method according to claim 8, where the second encoding method produces more highly compressed digital content than the first encoding method.

10. The method according claim 8, where the first digital encoding method comprises MPEG-2 encoding, and where the second digital encoding method comprises AVC encoding.

11. A device, comprising:
- a digital content player that is configured to receive a stream of digital content having substitutable portions, the stream of digital content being encoded using a first encoding method where the digital content has a first segment of the digital content identified using a first segment identifier, and a plurality of sets of substitute segments of digital content forming a part of the segment of digital content which are identified by a corresponding plurality of segment identifiers;
- a memory device that stores one of the plurality of segment identifiers corresponding to the sets of segments of substitute content that are to be substituted;
- a logic circuit to:
- determine that the content contains the one of the plurality of segment identifiers;
- insert the substitutable portion having the one of the plurality of segment identifiers, disregarding substitutable portions not identified by the one of the plurality of segment identifiers;
- upon determining a substitution point in the content, switching from a first decoding method corresponding to the first encoding method to a second decoding method to decode the substitutable portion inserted, the second decoding method corresponding to a second encoding method, where the second encoding method produces differently encoded digital content than the first encoding method.

12. The device according to claim 11, further comprising a second decoder that is configured to decode content encoded using the second encoding method, where the plurality of sets of substitute segments of digital content are encoded using the second encoding method, where the second encoding method produces differently compressed digital content than the first encoding method.

13. The device according to claim 12, further comprising a processor that is configured to:
- upon encountering a substitution point in the content, switch from the first decoder that decodes content encoded using the first encoding method to the second decoder that decodes content encoded using the second encoding method, and
- upon completion of decoding the inserted substitute portion switch from the second decoder back to the first decoder.

14. The device according to claim 12, where the first and second decoders comprise a single programmable decoder that is switched from a first decoding method to a second decoding method.

15. The device according to claim 12, where the second digital encoding method comprises AVC encoding.

16. The device according to claim 11, where the first digital encoding method comprises MPEG-2 encoding.

17. The device according to claim 11, where the content segments are sent as MPEG2 Transport Stream packets and identified using segment identifiers in the form of packet identifiers (PIDs).

18. The device according to claim 11, where the content segments are sent as Internet Protocol (IP) packets and identified using segment identifiers in the form of one of IP address and port numbers, and content identification fields within IP packets.

* * * * *